May 31, 1955
C. F. STIERLEN
2,709,264
FLUSH TANK VALVE
Filed Aug. 1, 1952
2 Sheets-Sheet 1
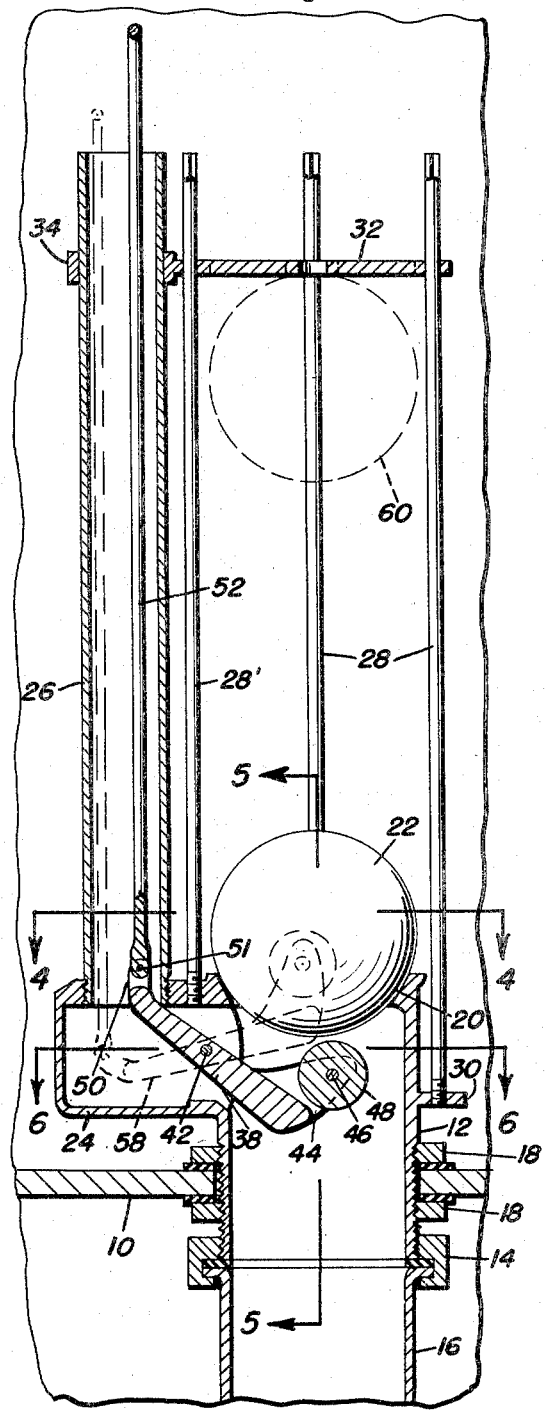
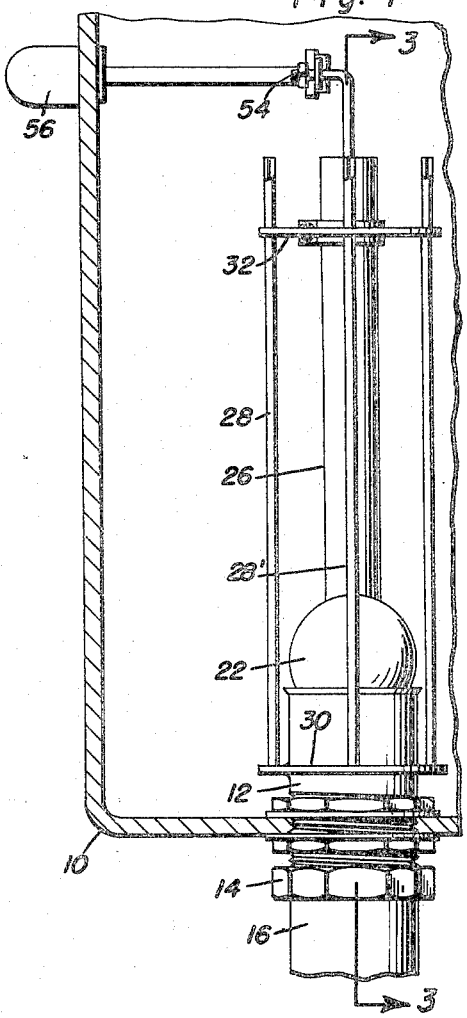
Charles F. Stierlen
INVENTOR.
BY *O'Brien and Harvey B. Jackson*
Attorneys May 31, 1955  C. F. STIERLEN  2,709,264
FLUSH TANK VALVE Filed Aug. 1, 1952  2 Sheets-Sheet 2

Charles F. Stierlen
INVENTOR.

BY *Clarence A. O'Brien*
*and Harvey B. Jacobson*
Attorneys

United States Patent Office 2,709,264
Patented May 31, 1955

2,709,264
FLUSH TANK VALVE

Charles F. Stierlen, Lima, Peru

Application August 1, 1952, Serial No. 302,028

1 Claim. (Cl. 4—57)

This invention relates to new and useful improvements and structural refinements in flush tank valves, and the principal object of the invention is to provide a dependably seating, easily actuated and efficiently operating valve which does not require any adjustment and will function satisfactorily for long periods of time without wear and resultant leakage.

An important feature of the invention resides in the provision of a valve fitting having a seat for a valve ball which is movable vertically in an elongated cage carried by the fitting, while another feature of the invention resides in the provision of means for unseating the valve ball, which means include a lever mounted in the valve fitting so as to engage the underside of the ball, and an actuating rod connected to the lever and extending upwardly through the usual stand pipe for actuation by a conventional flush control.

Some of the advantages of the invention lie in its simplicity of construction and in its adaptability to installation in tanks of different sizes and types.

With the above more important objects and features in view, and such other objects and features as may become apparent as this specification proceeds, the invention consists essentially of the arrangement and construction of parts as illustrated in the accompanying drawings, in which:

Figure 1 is an elevational view of the invention installed in a tank;

Figure 3 is a vertical sectional view, taken substantially in the plane of the line 3—3 in Figure 1;

Like characters of reference are employed to designate like parts in the specification and throughout the several views.

Figure 2:
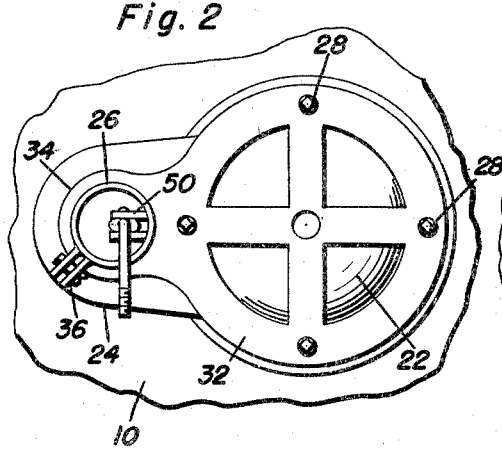
Figure 2 is a top plan view thereof.
Figure 4:
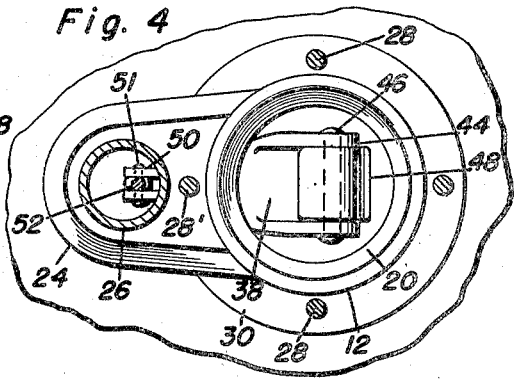
Figure 4 is a horizontal sectional view, taken substantially in the plane of the line 4—4 in Figure 3 but with the valve ball removed.
Figure 5:
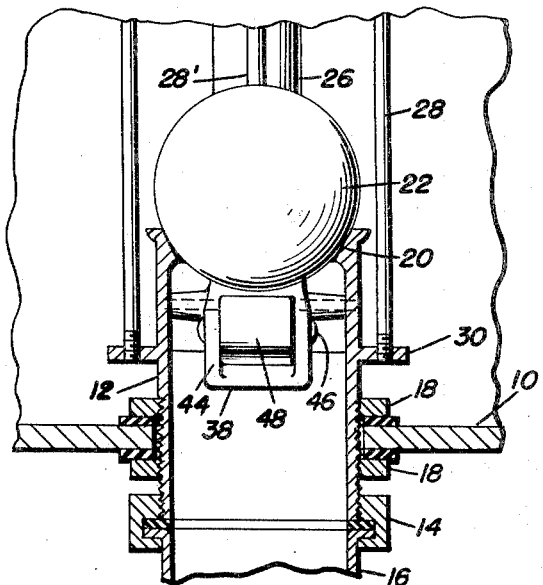
Figure 5 is a vertical sectional detail, taken substantially in the plane in the line 5—5 in Figure 3.
Figure 7:
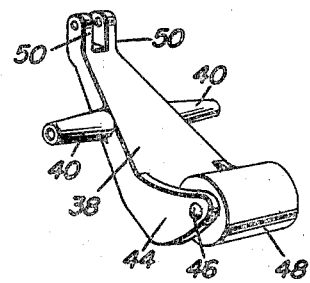
Figure 7 is a perspective view of the lever and roller used in the invention.
Figure 6:
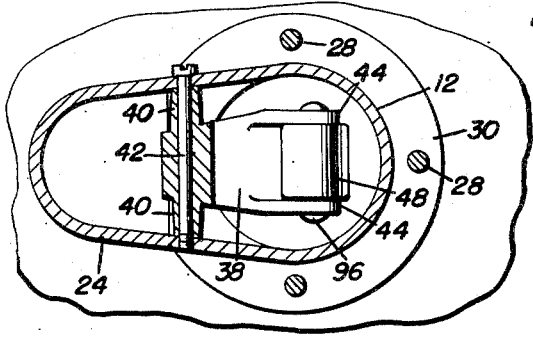
Figure 6 is a horizontal sectional detail, taken substantially in the plane of the line 6—6 in Figure 3.

Referring now to the accompanying drawings in detail, the general reference character 10 designates a conventional toilet tank provided with a flush valve fitting 12 in the bottom thereof, this fitting being connected by a suitable coupling member 14 to the usual flushing conduit 16.

The fitting 12 which is substantially tubular in form, is externally screw-threaded to accommodate nuts 18 which secure the fitting in the bottom of the tank 10, and the upper end of the fitting is provided with a seat 20 for a ball 22.

The fitting 12 is also provided with a lateral extension 24 communicating with the lower end of a stand pipe 26, and the ball 22 is vertically movable in a cage consisting of a plurality of spaced, vertical rods 28, 28'. The lower end of the rod 28' is threaded into the top of the fitting 12 while the lower ends of the rods 28 are threaded in an outwardly projecting flange 30 with which the fitting is provided. The upper end portions of the rods 28, 28' are sustained in the apertured keeper plate 32 which is provided with a lateral extension 34 fixed to the upper portion of the stand pipe 26 by suitable clamp means 36.

A lever 38, provided at the opposite sides thereof with apertured bearing members 40, is pivotally mounted upon a pin or screw 42 extending transversely of the extension 24 of the fitting 12, one end portion of this lever being provided with apertured ears 44 carrying a pin 46 on which is mounted a rotatable roller 48. This roller is engageable with the underside of the ball 22 when the latter engages the seat 20.

The other end of the lever 38 terminates in a fork 50 to which is connected by means of a pin 51 the lower end of an actuating rod 52. This rod extends upwardly through the stand pipe 26 and has the upper end thereof operatively connected as at 54 to a conventional flushing control 56 on the tank 10.

The ball 22 is somewhat buoyant, in the sense that it is slightly lighter in weight than the volume of water which it displaces. When the tank is full of water, the ball is sustained in engagement with the seat 20 by water pressure, but when the control 56 is actuated so as to swing the lever 38 to the position shown by dotted lines 58 in Figure 3, the roller 48 will engage the ball and disengage the latter from the seat 20, whereupon the ball, by virtue of its buoyancy, will ascend to the top of the cage 28, 28' as indicated by the dotted line 60. Water will then be discharged from the tank through the fitting 12 and conduit 16 and the ball will descend with the level of the discharging water until it is again seated in the seat 20 to close the valve.

It will be noted that by virtue of its movability in the cage 28, 28', the ball 22 is free to rotate so that any portion of its surface may engage the seat 20 and thereby prevent wear such as would be caused if the same portion of the ball always contacted the seat.

It is believed that the advantages and use of the invention will be readily understood from the foregoing disclosure and, accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a flush tank, the combination of a valve fitting provided with a top valve seat and a laterally projecting extension, a stand pipe connected to said extension, a vertically elongated cage attached to the fitting and disposed above said seat, a valve ball for seating on said seat and downwardly and upwardly movable in said cage to seat and unseat the same respectively, a vertically swingable lever pivotally mounted in said extension with a roller on one end thereof beneath said ball directly engaged with the underside of the ball with a delayed action to unseat the ball upon vertical swinging of said lever, a rod extending through said standpipe and operatively connected to said lever for operation to swing the lever, and means for operating said rod.

References Cited in the file of this patent

UNITED STATES PATENTS

| | | |
|---|---|---|
| 999,619 | Young | Aug. 1, 1911 |
| 1,054,940 | Rea | Mar. 4, 1913 |
| 1,079,036 | Tosco et al. | Nov. 18, 1913 |
| 1,538,656 | Richardson | May 19, 1925 |
| 1,553,616 | Johnson | Sept. 15, 1925 |
| 1,655,894 | Davenport | Jan. 10, 1928 |
| 2,229,887 | Groeniger | Jan' 28, 1941 |
| 2,430,765 | Garrigan | Nov. 11, 1947 |